US012448280B2

(12) United States Patent
Heuck et al.

(10) Patent No.: US 12,448,280 B2
(45) Date of Patent: Oct. 21, 2025

(54) BOND STRUCTURES ON MEMS ELEMENT AND ASIC ELEMENT (71) Applicant: Robert Bosch GmbH, Stuttgart (DE)

(72) Inventors: Friedjof Heuck, Stuttgart (DE); Jochen Tomaschko, Gaeufelden (DE); Peter Schmollngruber, Aidlingen (DE); Thomas Friedrich, Moessingen-Oeschingen (DE); Volkmar Senz, Metzingen (DE); Mike Schwarz, Viermünden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/977,458

(22) PCT Filed: Mar. 7, 2019

(86) PCT No.: PCT/EP2019/055641
§ 371 (c)(1),
(2) Date: Sep. 1, 2020

(87) PCT Pub. No.: WO2019/192797
PCT Pub. Date: Oct. 10, 2019

(65) Prior Publication Data
US 2020/0399116 A1 Dec. 24, 2020

(30) Foreign Application Priority Data
Apr. 5, 2018 (DE) .......................... 102018205156.9

(51) Int. Cl.
B81B 7/00 (2006.01)
B81C 1/00 (2006.01)

(52) U.S. Cl.
CPC ........ *B81B 7/0006* (2013.01); *B81C 1/00238* (2013.01); *B81B 2201/0264* (2013.01);
(Continued)

(58) Field of Classification Search
CPC .......................... B81B 7/0006; B81C 1/00238
See application file for complete search history.

(56) References Cited

U.S. PATENT DOCUMENTS

2014/0299948 A1 10/2014 Wang et al.
2015/0298965 A1 10/2015 Tsai et al.
(Continued)

FOREIGN PATENT DOCUMENTS

CN 104891429 A 9/2015
CN 105452153 B 8/2017
(Continued)

OTHER PUBLICATIONS

International Search Report for PCT/EP2019/055641, Issued May 29, 2019.

*Primary Examiner* — Nathan W Ha
(74) *Attorney, Agent, or Firm* — NORTON ROSE FULBRIGHT US LLP (57) ABSTRACT A MEMS element is provided. The MEMS element includes: a substrate; a first passivation layer arranged on the substrate; a metal layer arranged on the first passivation layer; a second passivation layer arranged on the metal layer and on the first passivation layer; and a punch element, an electrically conductive diffusion-blocking layer being arranged on the punch element and on the second passivation layer, a first bonding element being arranged on the punch element.

15 Claims, 7 Drawing Sheets (52) U.S. Cl.
CPC ..... *B81B 2207/012* (2013.01); *B81B 2207/07* (2013.01); *B81C 2203/035* (2013.01); *B81C 2203/0792* (2013.01)

(56) References Cited

U.S. PATENT DOCUMENTS

| | | |
|---|---|---|
| 2016/0233197 A1 | 8/2016 | Smeys et al. |
| 2017/0369308 A1 | 12/2017 | Liu et al. |

FOREIGN PATENT DOCUMENTS

| | | |
|---|---|---|
| DE | 102015116353 A1 | 5/2016 |
| DE | 102015103485 A1 | 9/2016 |
| DE | 102016115067 A1 | 7/2017 |

BOND STRUCTURES ON MEMS ELEMENT AND ASIC ELEMENT

FIELD

The present invention relates to a MEMS element. The present invention also relates to an ASIC element. The present invention also relates to a micromechanical sensor having a MEMS element and an ASIC element. The present invention further relates to a method for manufacturing a micromechanical sensor.

BACKGROUND INFORMATION

Modern packaging technologies necessitate that the pressure-sensitive part of a pressure sensor, the pressure sensor diaphragm, must be mechanically decoupled from the remainder of the sensor using a special spring design, thereby rendering the diaphragm independent of packaging influences. External influences which put the pressure sensor under mechanical stress, for example bending, include mechanical stress due to a molding process, a design which incorporates a material mix having different thermal expansion coefficients, and stress due to connections of the assembled sensor on an external customer circuit board, among other things.

German Patent Application No. DE 10 2015 116 353 A1 describes a micro-integrated, encapsulated MEMS sensor with mechanical decoupling and a method for its manufacture.

German Patent Application No. DE 10 2015 103 485 A1 describes a MEMS sensor, in particular a pressure sensor.

U.S. Patent Application No. US 2014/0299948 A1 describes a silicon-based MEMS microphone, a system, and a package comprising said elements.

SUMMARY

It is an object of the present invention to provide an improved chip-to-chip contact, in particular for use for a micromechanical sensor.

According to a first aspect of the present invention, the object is accomplished using a MEMS element comprising:
a substrate;
a first passivation layer arranged on the substrate;
a metal layer arranged on the first passivation layer;
a second passivation layer arranged on the metal layer and on the first passivation layer; and
a punch element, an electrically conductive diffusion-blocking layer being arranged on the punch element and on the second passivation layer, a first bonding element being arranged on the punch element.

In this way, a MEMS element having a punch structure is provided, the punch structure being provided for a subsequent eutectic-bonded connection to an ASIC component in order to thereby create a reliable electrical connection of metal layers of chips to be connected.

According to a second aspect of the present invention, the object may be accomplished using an ASIC element comprising:
a second substrate;
an ASIC functional layer arranged on the second substrate;
a metal layer arranged on the ASIC functional layer and an oxide layer having vias;
a passivation layer arranged on the oxide layer, the passivation layer being designed as a spacer element and a trough element, a bonding element being able to be plunged into the trough element in a eutectic bonding process, an outflow of eutectic material being thereby preventable.

In this way, an ASIC element is provided which has a trough structure and a spacer suitable for a subsequent eutectic bonding process to a MEMS element in order to establish a reliable electrical connection between metal layers of the ASIC element and of the MEMS element.

According to a third aspect of the present invention, the object may be accomplished using a method for manufacturing a micromechanical sensor, said method comprising the following steps:
providing a sensor element;
providing a MEMS element having a dimensionally stable punch element and a first bonding element arranged thereon;
providing an ASIC element having a trough structure formed in a passivation layer, a second bonding element arranged in the trough structure, and a spacer structure;
eutectic bonding the MEMS element to the ASIC element in such a way that the punch element plunges into the trough structure and that a defined separation is established between the MEMS element and the ASIC element by way of the spacer structure.

This provides a micromechanical sensor which has a reliable electrical connection between metal layers of the elements involved.

Preferred specific embodiments of the MEMS element and the ASIC element of the present invention are described herein.

An advantageous refinement of the MEMS element in accordance with the present invention includes that a material of the punch element is aluminum or dielectric material. This allows different specific embodiments of the dimensionally stable punch element to be provided. In the case of an embodiment of the punch element which comprises a dielectric material (for example oxide, nitride, etc.), it is an advantage that adhesion of the eutectic material is improved and that bonding material (for example in the form of germanium) cannot alloy with the material of the punch element. This aids in preventing germanium from penetrating into the metal layer. After the bonding, electrical current is directed around the punch element by way of a diffusion-blocking layer.

Another advantageous refinement of the MEMS element in accordance with the present invention includes that the diffusion-blocking layer is diffusionally stable relative to the first bonding element. To achieve this, it is preferable for the diffusion-blocking layer to be one of the following: titanium, titanium nitride, tantalum, or tantalum nitride. This keeps the diffusion-blocking layer from reacting with the bonding material and from diffusing into it.

Another advantageous refinement of the MEMS element in accordance with the present invention includes that the diffusion-blocking layer comprises notches in a planar area. This supports the formation of a chip-to-chip contact having a large amount of surface area, which makes it possible to avoid electrical short-circuits between chip-to-chip contacts.

Another advantageous refinement of the MEMS element in accordance with the present invention includes that the diffusion-blocking layer comprises two partial diffusion-blocking layers. This aids in preventing diffusion of germanium into the metal layer. This advantageously provides a further diffusion barrier below the punch element.

Another advantageous refinement of the MEMS element in accordance with the present invention includes that a first partial diffusion-blocking layer is structured. This advantageously allows the punch element to be even more mechanically stable.

Another advantageous refinement of the MEMS element in accordance with the present invention includes that the punch element is arranged on the first passivation layer. This further advantageously improves a mechanical adhesion of the punch element, and thereby a mechanical stability of the bonded element (for example based on externally imposed mechanical stress).

Another advantageous refinement of the MEMS element in accordance with the present invention includes that the punch element is arranged on an opening of the second passivation layer. This facilitates an electric flow of current between the punch element and the metal layer if the punch element is made of metal.

Another advantageous refinement of the MEMS element in accordance with the present invention includes that the punch element is arranged on the first passivation layer, mutually delimited openings of the first passivation layer being formed around the punch element, the diffusion-blocking layer being arranged on the second passivation layer and on the openings of the first passivation layer. In this way, an electrical resistance may be further reduced such that it is no longer necessary for the diffusion-blocking layer to be split up into two partial layers.

Another advantageous refinement of the MEMS element in accordance with the present invention includes that the diffusion-blocking layer is structured in a plane and the opening is not formed over a topographical edge. This advantageously facilitates the formation of chip-to-chip contacts having a large amount of surface area.

Another advantageous refinement of the MEMS element in accordance with the present invention includes that the material of the punch element is a dielectric material and the diffusion-blocking layer is structured. This supports an improved mechanical connection of the eutectic material with the punch element.

Another advantageous refinement of the ASIC element in accordance with the present invention provides that a metal structure which is separated from the second bonding element is formed in the passivation layer. This provides a type of protective ring into which no germanium penetrates. This improves a load limit of the trough structure, allowing a counterforce from above to be better absorbed during the bonding process. This advantageously prevents the trough structure from breaking apart and fluid eutectic material from draining out of the trough structure.

The present invention is described in detail below including further features and advantages with the aid of multiple figures. Identical or functionally equivalent elements have the same reference signs. In particular, the figures are intended to clarify the main features of the present invention and are not necessarily sketched exactly to scale. For the sake of better clarity, it may be that not all reference signs are indicated in every figure.

Disclosed method features follow analogously from corresponding disclosed device features and vice versa. In particular, this means that features, technical advantages, and explanations relating to the MEMS element, the ASIC element and the micromechanical sensor follow from corresponding features, technical advantages and explanations relating to the method for manufacturing said elements and vice versa.

DETAILED DESCRIPTION OF EXAMPLE EMBODIMENTS

A main feature of the present invention is to provide improved chip-to-chip contact. The example chip-to-chip contact in accordance with the present invention can be used in general to connect two components by eutectic bonding and is advantageously not limited to a use in a pressure sensor, but can be used for a variety of micromechanical sensor types (such as inertial sensors).

The example chip-to-chip contact functions as a way to provide a reliable electrical connection between the components to be connected, i.e., between the last metal layers in a MEMS element and in an ASIC element.

Such eutectic bonding is accomplished through the alloying of germanium (on the MEMS element) and aluminum (the last metal layer of the ASIC element). However, it is advantageous that the present invention is not limited to this specific eutectic bond connection but can be implemented using other conventional bonding partners. Examples of suitable metallic bonding methods include Al—Ge, Au—Si, Cu—Sn, Al—Al, Cu—Cu, Au—Au, etc.

During the bonding process, which is carried out at high temperature, all of the available aluminum and germanium melts and for a sufficiently short period of time exists primarily as a liquid with isolated solid grains in it.

At temperatures in the vicinity of or above the eutectic temperature, aluminum is very soft and can be easily compressed using contact pressure. Full "eutectic" melting of aluminum is not required here. Even small additional amounts of germanium in aluminum lead to further significant softening of the aluminum. There is no significant volume change due to the alloying of aluminum and germanium, which means that as a first approximation it can be assumed that the process is volume neutral.

Figure 1:
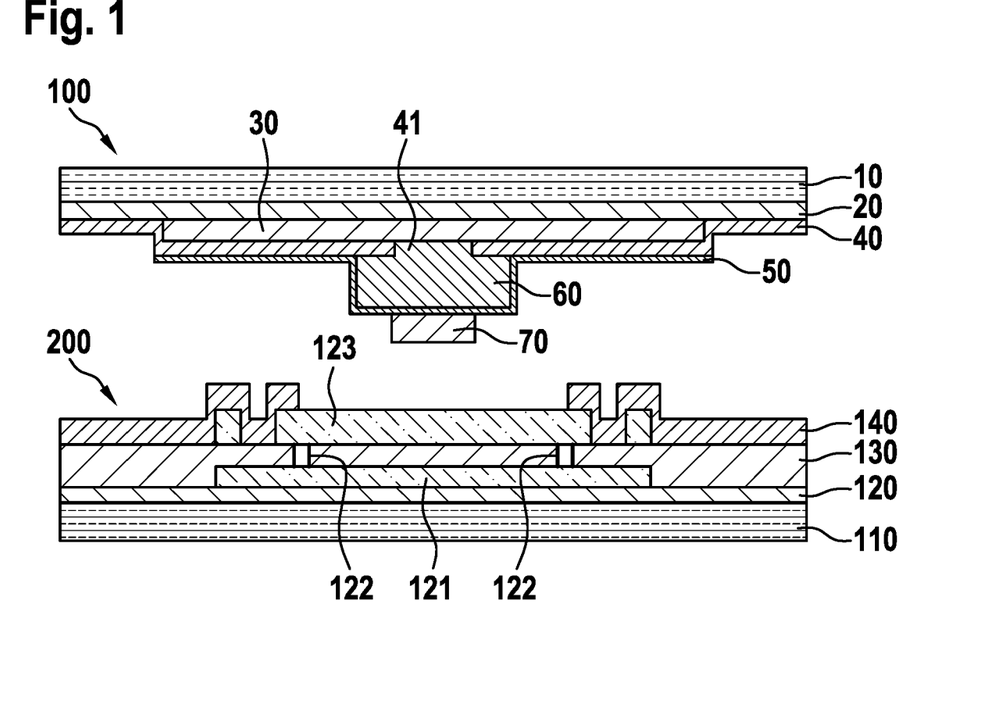
FIG. 1 shows a cross-sectional view of specific embodiments of an example MEMS element and the ASIC element prior to a bonding process in accordance with the present invention.
Figure 2:
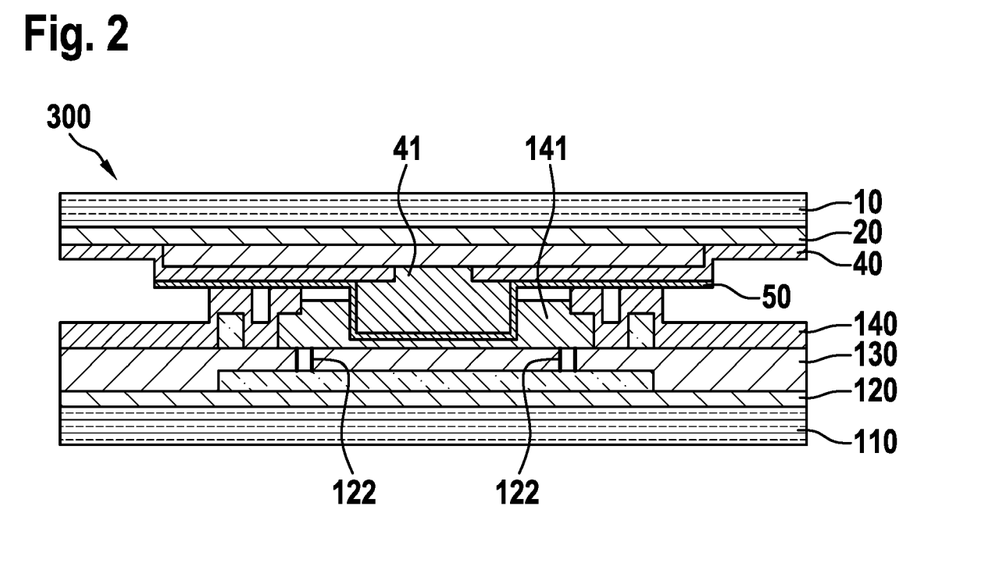
FIG. 2 shows a cross-sectional view of a specific embodiment of the example chip-to-chip contact after a bonding process in accordance with the present invention.

FIG. 1 shows a cross section of chip-to-chip contact elements prior to bonding, and FIG. 2 shows a cross section of said elements after bonding.

Seen in FIG. 1 is a MEMS element 100 having a substrate in the form of a silicon layer 10, a first passivation layer 20 being arranged on the silicon layer (for example in the form of an oxide layer $SiO_2$). A second passivation layer 40 and a first metal layer 30 are arranged on first passivation layer 20. Here, as shown in FIG. 1, at least a part of second passivation layer 40 may be arranged next to metal layer 30 on first passivation layer 20. Furthermore, second passivation layer 40 covers metal layer 30 at least partially. Second passivation layer 40 has an opening 41, a punch element 60 being arranged on the opening 41 of second passivation layer 40. This opening 41 can directly represent a connection of punch element 60 to metal layer 30, for example in that opening 41 is formed above metal layer 30 (from the perspective of the substrate) or directly lateral to metal layer 30. Punch element 60 can be made of aluminum or a dielectric material, for example silicon dioxide or silicon nitride. An electrically conducting diffusion-blocking layer 50 is arranged on punch element 60. A first bonding element 70 (for example germanium) is arranged on diffusion-blocking layer 50 at punch element 60.

In the lower section of FIG. 1, a cross section of an ASIC element 200 is shown, comprising a silicon layer 110 on which an ASIC functional layer 120 is arranged, the functional layer comprising a plurality of metal layers, vias and oxide layers (not shown) for creating the ASIC functionality ("ASIC back end") of ASIC element 200. A second metal layer 121 is arranged on ASIC functional layer 120, as is a further oxide layer 130 in which electrical vias 122 are formed. A passivation layer 140 is formed on oxide layer 130 as a spacer structure which forms a trough-like structure, a second bonding element 123 (for example aluminum) being arranged in the passivation layer.

Figure 10:
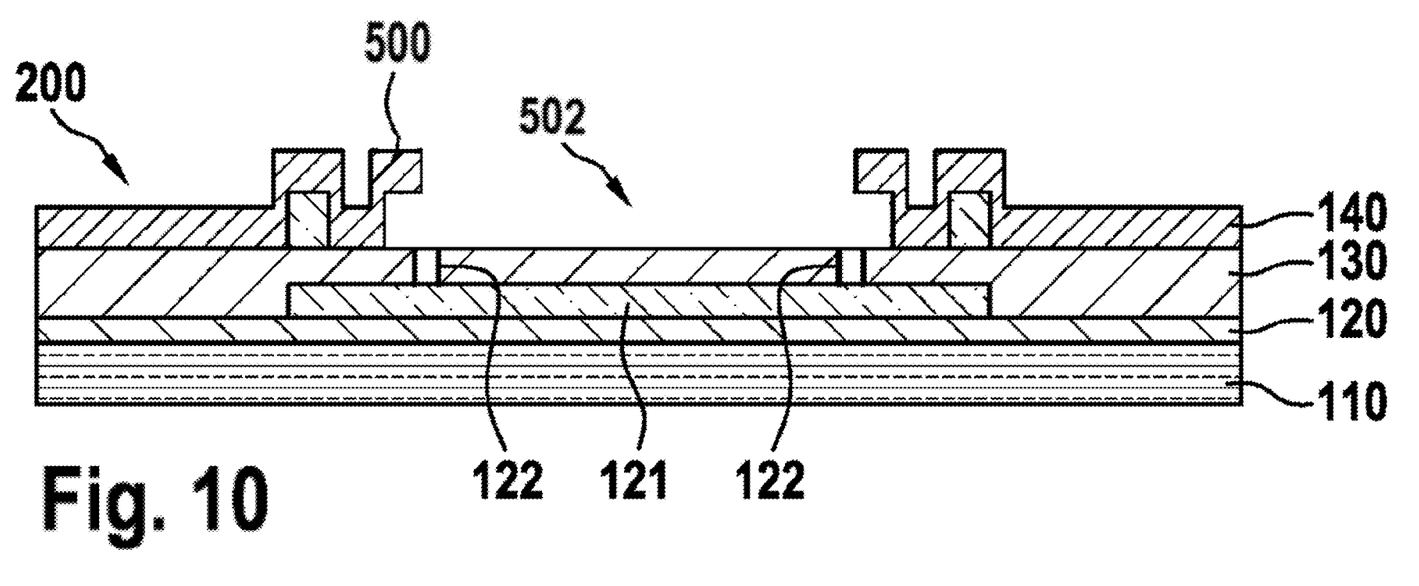
FIG. 10 shows a cross-sectional view of an ASIC element of FIG. 1.

FIG. 10 shows the ASIC element 200 of FIG. 1, but without the second bond element 123 to show the trough structure 502 formed within the spacer element 500 of the passivation layer 140, the trough structure 502 being a space within the passivation layer 140 functioning as a container for holding the second bond element 123 therein (as shown in FIG. 1), and being of sufficient height that outflow of eutectic material 141 is prevented in that the eutectic material remains in the trough structure 502 (as shown in FIG. 2 and described below).

This results in the following areas inside a feasible chip-to-chip contact, the areas having the following functions:

Punch element 60 provides a mechanical connection after bonding, punch element 60 not deforming during and after the bonding. Punch element 60 thus represents a reference parameter for the mechanical connection between MEMS element 100 and ASIC element 200. Punch element 60 pushes the Ge structure sufficiently far into the opposing passivation opening such that when the two wafers are pressed together the germanium comes first into contact with the opposing aluminum. In addition, punch element 60 must establish the electrical contact between the eutectic material and the sensor conductor path.

The trough structure of passivation layer 140 defines the area in which the liquid eutectic material 141 (for example aluminum-germanium) is located. It must reliably compensate for process tolerances, layer thickness and structure widths so that no alloyed aluminum-germanium is forced out of the trough and so that punch element 60 reliably comes to lie inside the trough (taking into account the bond shift due to adjustments).

The spacer structure on passivation layer 140 seals the chip-to-chip contact, defines the height of the trough and absorbs the force in effect due to the pressing force during the bonding process once the eutectic material 141 has melted.

FIG. 2 shows a cross section through a chip-to-chip contact after bonding of MEMS element 100 to ASIC element 200.

Thus, the dimensioning of the eutectic material 141 and the individual areas results from the following:

punch element 60, whose surface area linearly scales the mechanical load capacity and the electrical conductivity. In the process, the height of punch element 60 is preferably selected such that it is greater than a passivation thickness of ASIC element 200. In addition, punch element 60 should advantageously come to lie below the initial Al surface after bonding, supporting a more reliable, stable bond. In order to accomplish this reliably, the height, the process tolerances, and the layer thicknesses which define the punch height should be taken into account, as should the layer thickness of passivation layer 140. It is preferable for the rectangular punch element 60 to have edge lengths in the range of between approximately 10 µm and approximately 100 µm in order to achieve plunging below the initial aluminum surface to an extent of approximately 0 to approximately 1 µm.

a trough structure, which after bonding is vertically defined by a passivation of MEMS element 100 and of punch element 60 on the MEMS side, and on the ASIC side is defined by the adjacent last metal plane. In the horizontal respect, the trough is defined by the spacer structure of passivation layer 140. A width of the trough is defined by the width of punch element 60 plus the bond shift on the left and the right.

A height of the trough structure is defined by the total of the layer thicknesses of the metal layer of second bond element 123 and passivation layer 140. The compensating volume of the trough structure is particularly important, being primarily defined by the spacing of punch element 60 and the height of passivation layer 140 and its distance to punch element 60. The AlGe interface comes to lie in this volume ("compensating volume") after the bonding process. This volume is defined by the process tolerances of punch element 60 and of passivation layer 140 and that of bond elements 70, 123. The volume is further defined by the displaced volume due to the plunging below the initial aluminum surface.

a spacer structure of passivation layer 140 which prevents outflow of eutectic material 141 from the trough structure. In an optimized specific embodiment, a distance of 1 µm to 10 µm is provided between the trough and the spacer structure. This distance also ensures against breakage of the trough edge so that no germanium can make its way to the aluminum substructure of the spacer.

a eutectic material 141 whose volume ratio between the bond elements (e.g. Ge and Al) should be selected to be as close to the eutectic ratio as possible. A germanium deviation in the direction of "too much" should be avoided here. Also, the volume ratio should be selected such that at nominal layer thicknesses the compensation volume of the trough structure is at most approximately half-filled. The germanium volume should be as wide (approximately 10 µm to approximately 100 µm) and as thin (approximately 100 nm to approximately 1 µm) as possible. The germanium structure should be within the width of punch element 60. In the Al volume, the width is defined by the trough width. The height of the Al volume should be in the order of magnitude of approximately 0.5 µm to approximately 2 µm. The Al layer may advantageously have a small interruption of approximately 1 µm next to punch element 60 on the left and right, a eutectic ratio thereby being easier to achieve below punch element 60.

The cross section shown in FIGS. 1 and 2 is an example of a cross section of an example chip-to-chip contact for a pressure sensor (not shown). The layers and their functions are as follows:

The electrical first passivation layer 20 between the metal conductor path and the silicon may be made of $SiO_2$. The layer thickness is in the order of magnitude of 0.1 µm to 1 µm.

Metal layer 30 forms an electric conductor path of MEMS element 100. It can be made of aluminum, with its layer thickness being in the order of magnitude of 0.1 µm to 1 µm.

The electrical second passivation layer 40 on the metal conductor path may be made of SiN (silicon nitride), with its layer thickness being approximately 0.1 µm to approximately 1 µm.

Punch element 60 may be made of a dielectric material (such as SiO2 or SiN) depending on the specific embodiment or may be electrically conducting (for example aluminum).

Diffusion-blocking layer 50 is electrically conducting and must be diffusionally stable relative to the metal layers 30, 123 and relative to eutectic material 141. It may be made of Ti, TiN, Ta, TaN, and combinations of said elements and compounds, among other things. The overall layer thickness of diffusion-blocking layer 50 is in the order of magnitude of approximately 0.05 µm-approximately 2 µm.

Passivation layer 140 is made of a dielectric material, which can be made of $SiO_2$ or silicon nitride or a combination of the two compounds. The layer thickness is in the order of magnitude of approximately 0.2 µm to approximately 2 µm.

The metal layer of second bond element 123 represents the last metal layer of ASIC element 200 and is preferably made of aluminum. The layer thickness of this metal layer is in the order of magnitude of approximately 0.5 µm to approximately 2 µm.

Further embodiment variations of the example chip-to-chip contact are shown in further figures in cross section. The goal in each case is to pass the electrical connection of electric metal layer 30 of MEMS element 100 through the eutectic material to the metal layer (the "last metal layer") of ASIC element 200 and finally into ASIC functional layer 120 through the via between the last and the next-to-last metal layer 121.

Referring to the cross-sectional view of FIG. 1, which corresponds to that of FIG. 2, the following layer sequence is provided: electrical passivation layer 20, first metal layer 30, second passivation layer 40, punch element 60 and diffusion-blocking layer 50. The material of punch element 60 may be made of an electrically conductive material such as aluminum. Thus, opening 41 may lie in second passivation layer 40 below punch element 60. Diffusion of germanium into punch element 60 must be prevented, therefore a closed and stable diffusion-blocking layer 50 is provided in the case where punch element 60 is made of aluminum.

Figure 3:
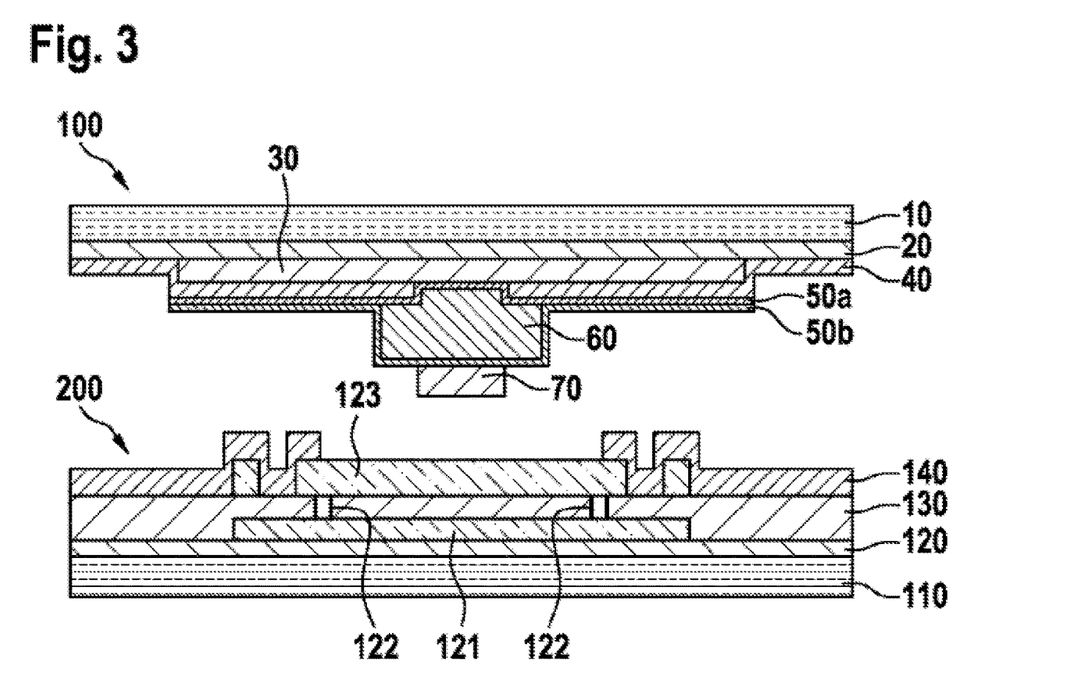
FIG. 3 shows a cross-sectional view of further specific embodiments of the example MEMS element and the ASIC element prior to a bonding process in accordance with the present invention.

The stability of the covering diffusion-blocking layer 50 can sometimes present problems. For this reason, diffusion-blocking layer 50 may alternatively be split up into two partial diffusion-blocking layers 50a, 50b as shown in FIG. 3. In the process, a first blocking layer 50a lies below punch element 60 and a second blocking layer 50b lies above punch element 60. Thus, penetration of germanium into punch element 60 is possible, but further diffusion of germanium into metal layer 30 is prevented by first blocking layer 50a in the opening of passivation layer 40 on metal layer 30.

Even if a small amount of germanium penetrates into the aluminum of punch element 60, the punch element will become very soft and will tend to be squished excessively. Furthermore, a collapsing/cracking of second partial diffusion-blocking layer 50b may cause a comparatively large amount of aluminum to take part in the eutectic bond. Thus, because of the probability distribution of breakage, it becomes difficult to keep the aluminum-to-germanium ratio near the eutectic ratio. Therefore, in a variant not shown in the figures, the first partial diffusion-blocking layer 50a may lie directly on metal layer 30 or on part of metal layer 30.

Figure 4:
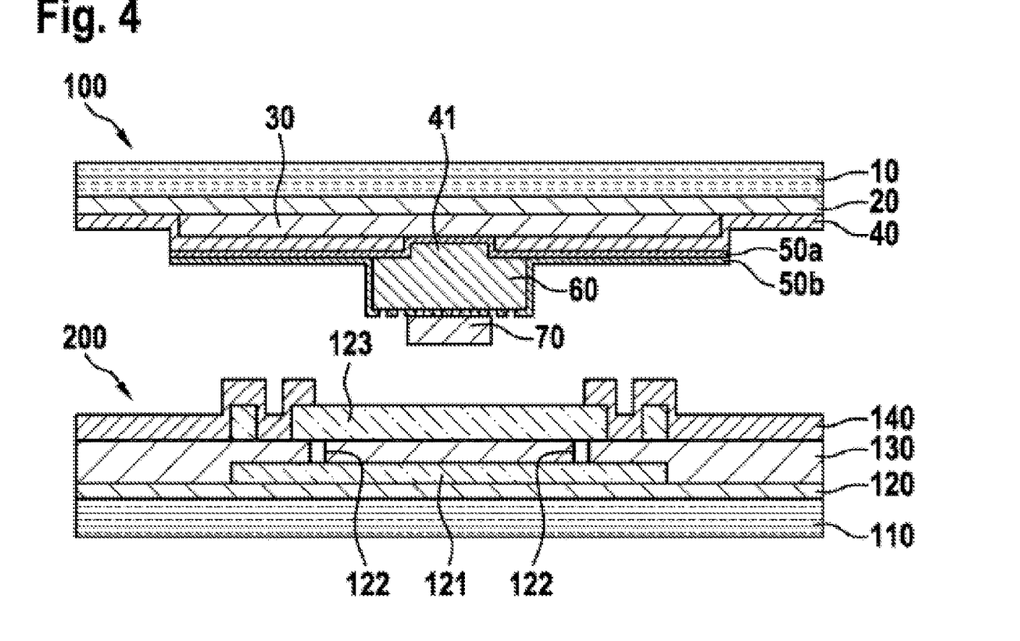
FIG. 4 shows a cross-sectional view of further specific embodiments of the example MEMS element and the ASIC element prior to a bonding process in accordance with the present invention.

Alternatively, the punch material of punch element 60 may, as indicated in FIG. 4 in color, also be a dielectric material, such as SiO2 or SiN. No germanium penetrates into these layers, they are sufficiently stable and thick so that penetration of germanium into metal layer 30 is no longer possible as per the layout. Also advantageous is the fact that diffusion-blocking layer 50 may be structured since deposition of germanium directly on the punch material is also possible. This structuring of diffusion-blocking layer 50 facilitates a better mechanical connection of the eutectic material 141 to punch element 60 since eutectic material 141 wetting on diffusion-blocking layer 50 is worse than it is on the punch element made of SiO2 or SiN. In this case, the electrical resistance, defined by the diffusion-blocking layer 50, runs along the contour of punch element 60. Since the conductivity and protective layer thickness of diffusion-blocking layer 50 is significantly less than punch element 60 in aluminum, the parasitic resistance is therefore higher in comparison to the specific embodiment of FIG. 3.

In order to reduce the electrical resistance of the specific embodiment of FIG. 4, opening 41 in second passivation layer 40 may be formed next to and around punch element 60. This eliminates the need to split up diffusion-blocking layer 50 into two partial diffusion-blocking layers 50a, 50b as explained in FIGS. 3 and 4.

Figure 6:
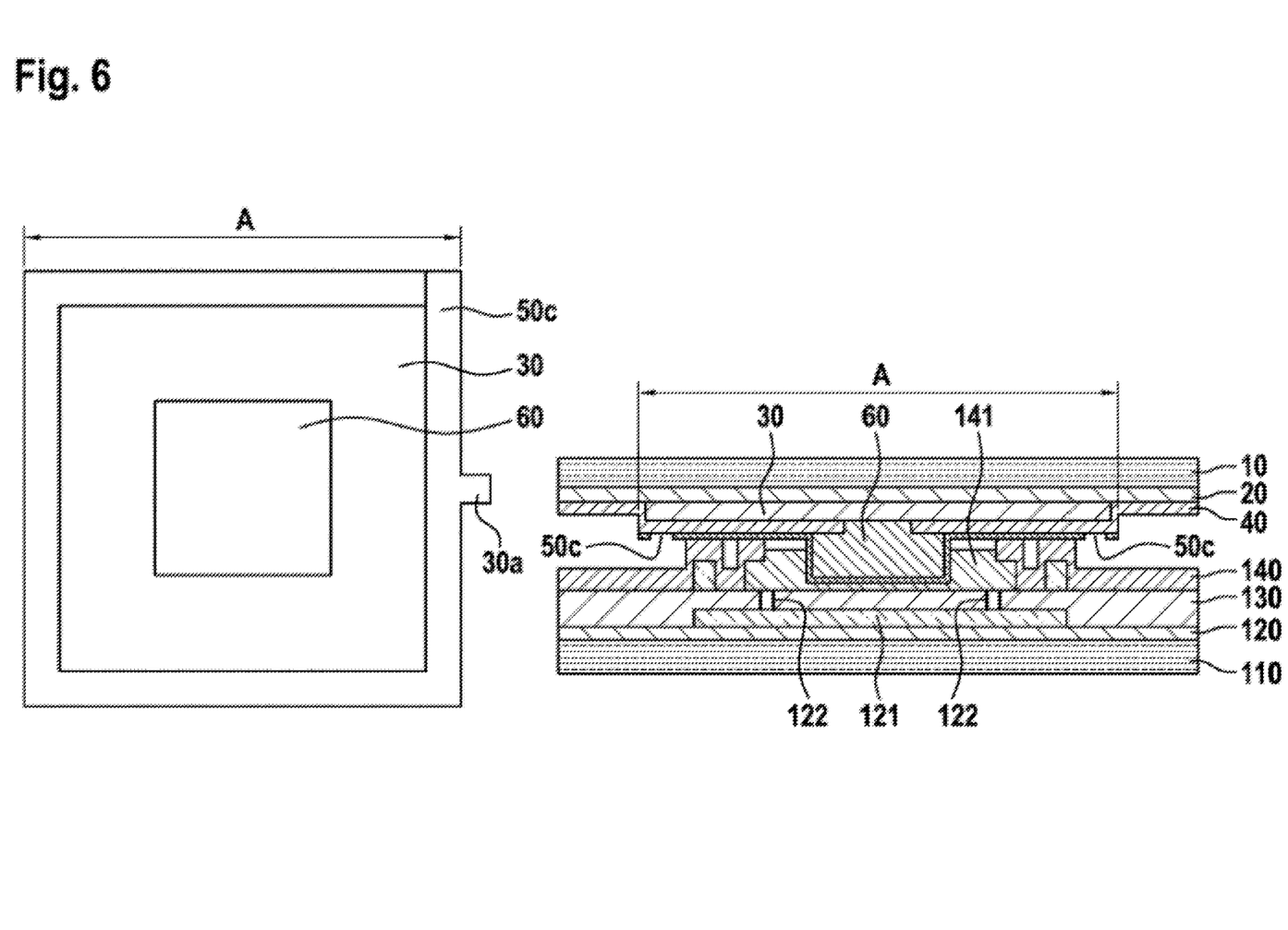
FIG. 6 shows a top view of a specific embodiment of the example chip-to-chip contact in accordance with the present invention.
Figure 7:
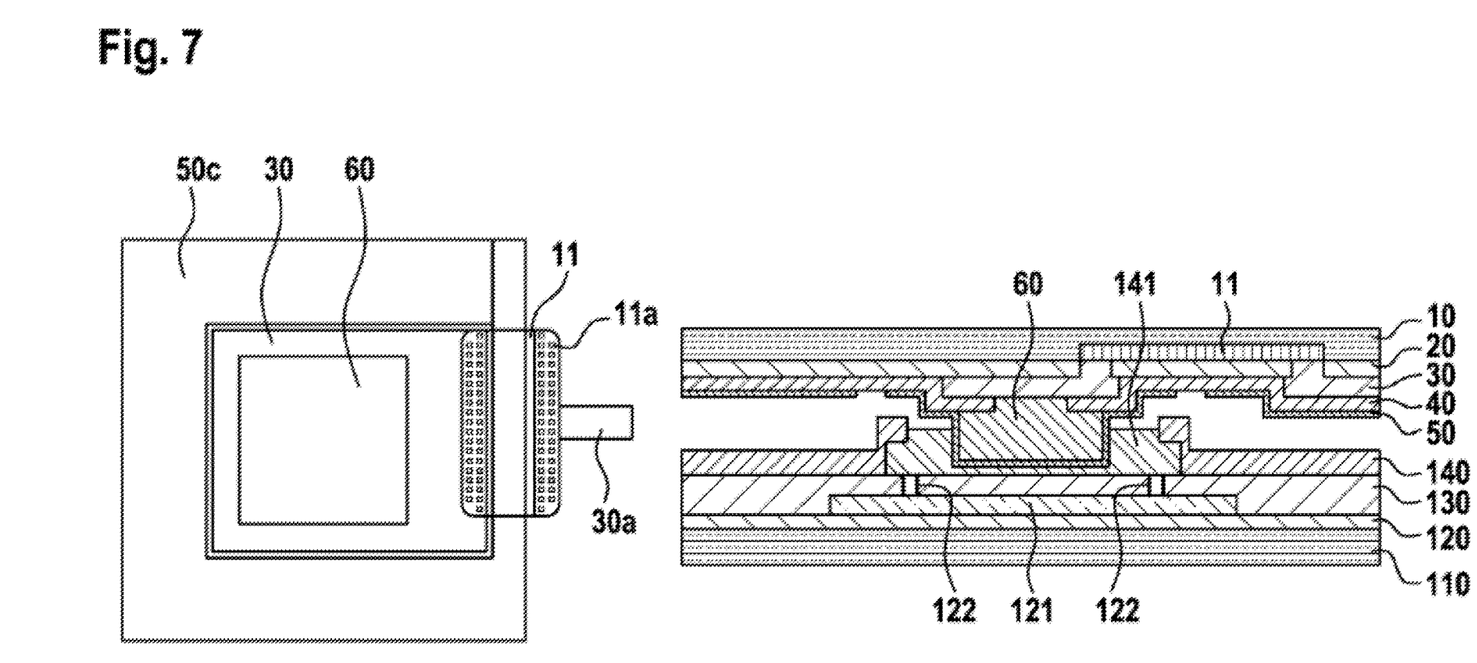
FIG. 7 shows a top view of a further specific embodiment of the example chip-to-chip contact in accordance with the present invention.

Possible variants of the chip-to-chip contact are shown in FIGS. 6 and 7 in top views. The rectangular shape makes it possible to design the chip-to-chip contact at as small a scale as possible. In particular, the size of the chip-to-chip contact here is a function of the size of punch element 60, which may be between approximately 5 µm and approximately 100 µm. In addition, in the design of the chip-to-chip contact, care must be taken that electrically conductive diffusion-blocking layer 50 is not structured past any topographical edge, but rather is structured in the plane only.

The reason for this is that whereas the deposition of diffusion-blocking layer 50 occurs relatively conformally, the structuring of diffusion-blocking layer 50 is very directional relative to the normal of the wafer surface. For directional etching, the conformal diffusion-blocking layer 50 appears to have a greater layer thickness than it does on planar areas. The result is that in planar areas diffusion-blocking layer 50 is completely removed, but at topographical edges residue remains behind. Excess etching to remove this residue is not allowed since this has a negative effect on the sensor's performance.

Structuring within diffusion-blocking layer 50 is necessary so as to electrically separate the chip-to-chip contacts from one another, electrical conductor paths of metal layer 30 being routed out from the chip-to-chip contact in this way.

A possible specific embodiment for this structuring of diffusion-blocking layer 50 is shown in FIG. 6, which represents a larger specific embodiment. Here, diffusion-blocking layer 50 is structured on the closed metal layer 30. The inner edge of notch 50c of diffusion-blocking layer 50 has the dimension of the spacer of passivation layer 140 plus the peripheral edge of the bond shift due to adjustment. The width of notch 50c of diffusion-blocking layer 50 defines the electrical insulation relative to ground potential, said width preferably being between approximately 1 μm and approximately 30 μm. The distance of metal layer 30 to the edge of diffusion-blocking layer 50 is defined by the lithography adjustment shift, the result being a length of metal layer 30 which ultimately defines a maximum dimension A of the chip-to-chip contact. Furthermore, there is an electrical feed 30a to a sensor element which is not shown.

FIG. 7 shows the smaller specific embodiment of the chip-to-chip contact. Here, the fact is utilized that for a pressure sensor, electrical connections are present in substrate 10. Therefore, the electrical connection from the chip-to-chip contact to the conductor paths of metal layer 30 is cut through substrate 10 in the form of a Si passage 11 with Si vias 11a. A parasitic resistance of this Si passage 11 remains within a reasonable range. In order to further shrink the chip-to-chip contact, spacers of passivation layer 140 for spacing MEMS element 100 are left out. These are not necessary for the chip-to-chip contact since they are integrated into the bond frame which has a larger surface area. In this way, the eutectic material 141 of the chip-to-chip contact remains open in the variant of FIG. 7.

In conventional bond frames and chip-to-chip contacts, metal surface 30 have a planar design. These comparatively large aluminum surfaces soften at temperatures near the eutectic bond temperature, which reduces the mechanical stability of the MEMS back end, which is made up of passivation layer 20, metal layer 30, passivation layer 40, punch element 60 and blocking layer 50. This causes the mechanical load on passivation layer 40, which surrounds metal layer 30, to increase, and thus the risk for cracks in passivation layer 40. This can be counteracted using a mesh-like structuring of metal layer 30 with small line widths which are small enough that they are filled up by the deposition of passivation layer 40 and are thus topography-free.

Figure 5:
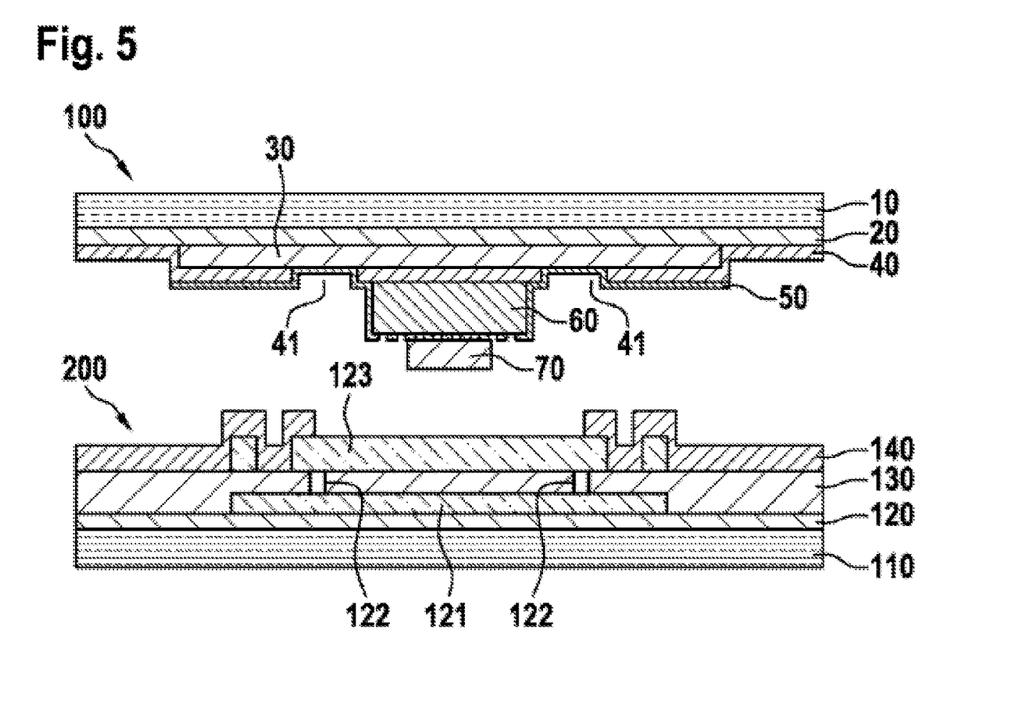
FIG. 5 shows a cross-sectional view of further specific embodiments of the example MEMS element and the ASIC element prior to a bonding process in accordance with the present invention.
Figure 8:
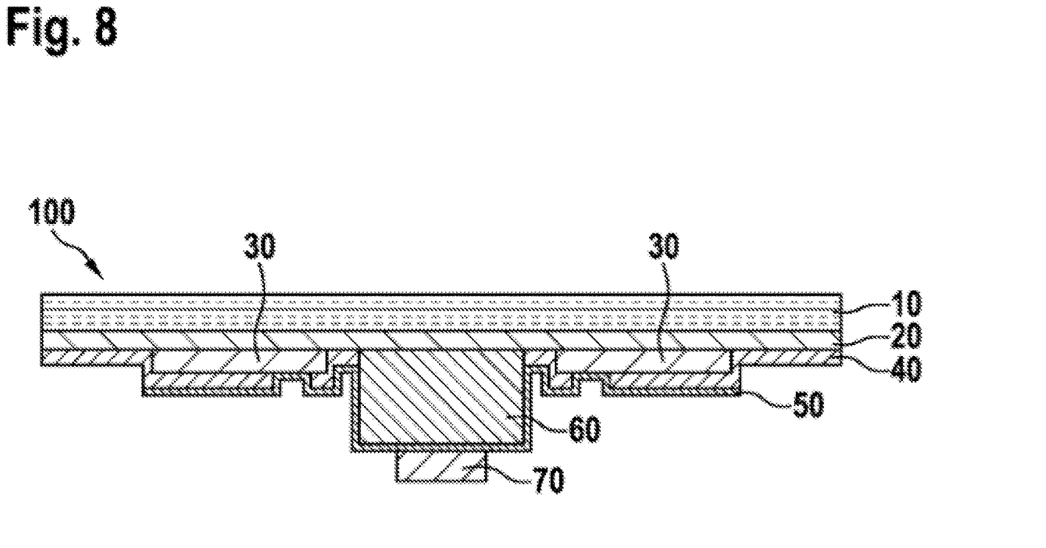
FIG. 8 shows a cross-sectional view of a further specific embodiment of a MEMS element prior to a bonding process in accordance with the present invention.

Alternatively, an alternative punch design can be provided for this purpose as shown in FIG. 8. In this alternative, metal layer 30 in punch element 60 is removed and the layer thickness of punch element 60 is increased accordingly, this only being possible when punch element 60 is made of a dielectric material. Since punch element 60 is also part of the bond frame, it must consequently be implemented identically there. In addition, the electrical connection in metal layer 30 must be ensured for there to be chip-to-chip contact. This can be done in accordance with the specific embodiment shown in FIG. 5.

In a further alternative specific embodiment, the bond frame can represent an electrical chip-to-chip contact. For this purpose, a smaller bond frame area may be provided having the cross section of a chip-to-chip contact, which is preferably a contact to ground potential.

Figure 9:
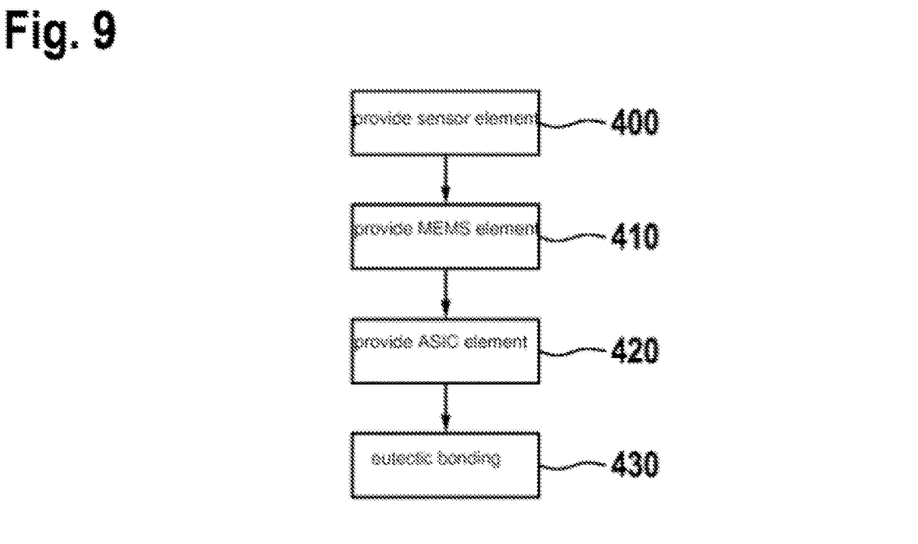
FIG. 9 shows a basic sequence of a method for manufacturing an example micromechanical sensor in accordance with the present invention.

FIG. 9 shows a basic method for manufacturing a micromechanical sensor.

In a step 400, a sensor element is provided.

In step 410, a MEMS element 100 is provided having a dimensionally stable punch element 60 and a first bond element 70 arranged thereon.

Provided in a step 420 are an ASIC element 200 having a trough structure formed in a passivation layer 140, a second bond element 123 and a spacer structure being arranged in said trough structure.

In a step 430, a eutectic bonding of MEMS element 100 to ASIC element 200 is carried out in such a way that punch element 60 plunges into the trough structure and a defined separation between MEMS element 100 and ASIC element 200 is established by way of the spacer structure.

Although the present invention has been described above using concrete application examples, a person skilled in the art, without straying from the essence of the present invention, can also implement specific embodiments which are not, or are only partially, disclosed.

What is claimed is:

1. A device comprising:
   an ASIC element, the ASIC element comprising:
      a first substrate;
      an ASIC functional layer arranged on the first substrate;
      a first metal layer arranged on the ASIC functional layer;
      an oxide layer having vias;
      a first bonding element; and
      a first passivation layer that is arranged on the oxide layer and that includes a spacer element that forms a trough (a) in which the first bonding element is arranged, (b) into which a second bonding element is able to be plunged during a eutectic bonding process, and (c) that prevents an outflow of eutectic material of the eutectic bonding process from the trough.

2. The device as recited in claim 1, wherein a metal structure, which is separated from the first bonding element, is formed in the passivation layer.

3. The device as recited in claim 1, further comprising:
   a micromechanical sensor, the micromechanical sensor comprising a MEMS element that includes:
      a second substrate;
      a second passivation layer arranged on the second substrate;
      a second metal layer arranged on the second passivation layer;
      a third passivation layer partially arranged on the second metal layer and partially arranged on the second passivation layer; and
      a punch element;
      an electrically conductive diffusion-blocking layer partially arranged on the punch element and partially arranged on the third passivation layer; and
      the second bonding element, the second bonding element being arranged on the punch element;
   wherein the eutectic bonding process eutectically bonds the ASIC element to the MEMS element.

4. The device as recited in claim 1, wherein the first bonding layer that is arranged in the trough is arranged on the oxide layer.

5. The device as recited in claim 3, wherein a material of the punch element is aluminum or a dielectric material.

6. The device as recited in claim 3, wherein the diffusion-blocking layer is diffusionally stable relative to the second bonding element.

7. The device as recited in claim 3, wherein the diffusion-blocking layer includes notches in a planar area.

8. The device as recited in claim 3, wherein the diffusion-blocking layer includes two partial blocking layers.

9. The device as recited in claim 8, wherein a first one of the two partial blocking layers is structured.

10. The device as recited in claim 5, wherein the punch element is arranged on the second passivation layer.

11. The device as recited in claim 3, wherein the punch element is arranged on an opening of the third passivation layer.

12. The device as recited in claim 3, wherein the punch element is arranged on the second passivation layer, mutually delimited openings of the first second passivation layer being arranged around the punch element, the diffusion-blocking layer being arranged on the third passivation layer and on the openings of the second passivation layer.

13. The device as recited in claim 3, wherein a material of the punch element is a dielectric material, and the diffusion-blocking layer is structured.

14. A method for manufacturing a micromechanical sensor, comprising the following steps:
providing a sensor element;
producing a device by:
providing a MEMS element;
providing an ASIC element that includes (I) a first substrate, (II) an ASIC functional layer arranged on the first substrate, (III) a first metal layer arranged on the ASIC functional layer, (IV) an oxide layer having vias, (V) a first bonding element, (VI) a first passivation layer that is arranged on the oxide layer and that includes a spacer element that forms a trough in which the first bonding element is arranged; and
performing a eutectic bonding process that bonds the MEMS element to the ASIC element and during which a second bonding element, which is part of the MEMS element, is plunged into the trough;
wherein:
the trough prevents an outflow of eutectic material of the eutectic bonding process from the trough; and
the device includes an electrical feed to the sensor element.

15. The method as recited in claim 14, wherein:
the MEMS element includes a dimensionally stable punch element on which the second bonding element is arranged; and
during the eutectic bonding process, the punch element is plunged into the trough and the spacer element establishes a separation between the MEMS element and the ASIC element.

* * * * *